INVENTOR
Herbert L. Bone.
BY
HIS ATTORNEY

April 12, 1938.  H. L. BONE  2,113,645
SPEED RESPONSIVE DEVICE
Filed March 20, 1935  4 Sheets-Sheet 2

INVENTOR
Herbert L. Bone.
BY
HIS ATTORNEY

April 12, 1938.  H. L. BONE  2,113,645
SPEED RESPONSIVE DEVICE
Filed March 20, 1935   4 Sheets-Sheet 3
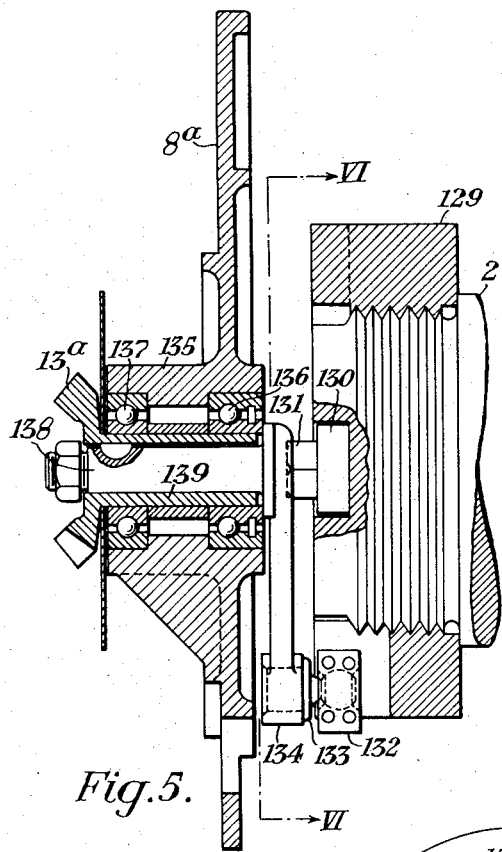
Fig.5.
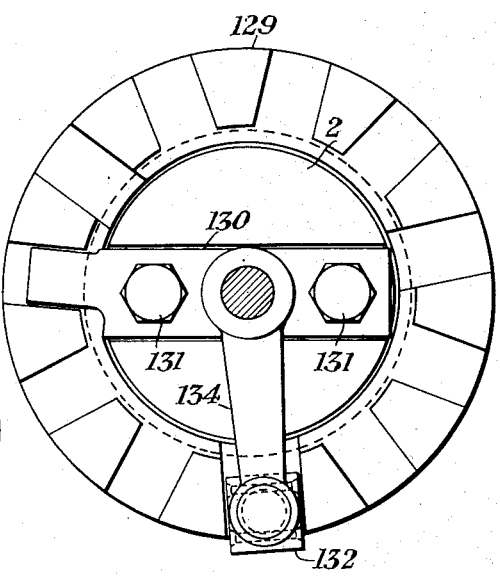
Fig.6.
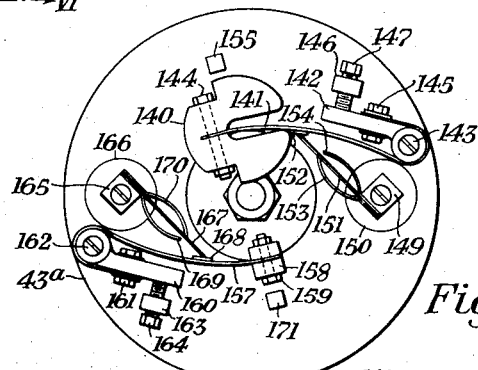
Fig.7.
Fig.8.
INVENTOR
Herbert L. Bone.
BY
HIS ATTORNEY April 12, 1938.  H. L. BONE  2,113,645

SPEED RESPONSIVE DEVICE

Filed March 20, 1935  4 Sheets-Sheet 4

INVENTOR
Herbert L. Bone.
BY
HIS ATTORNEY

Patented Apr. 12, 1938

2,113,645

UNITED STATES PATENT OFFICE 2,113,645

SPEED RESPONSIVE DEVICE

Herbert L. Bone, Pittsburgh, Pa., assignor to The Union Switch & Signal Company, Swissvale, Pa., a corporation of Pennsylvania Application March 20, 1935, Serial No. 12,002

11 Claims. (Cl. 200—80)

My invention relates to speed responsive devices.

I will describe several forms of apparatus embodying my invention, and will then point out the novel features thereof in claims.

An object of my invention is the provision of a novel and improved speed responsive device which is highly sensitive at a predetermined critical speed during both acceleration and deceleration, and wherewith movement of the governor parts occurs only at the critical speed, but once their motion has started a complete movement of the parts from one extreme position to another extreme position without further change in speed is effected. Another object of my invention is the provision of a speed responsive device of the type herein involved which is balanced against movement due to vibration or shocks. Still another object of my invention is the provision of a speed responsive device which is essentially a plurality of governors compactly mounted together, with each such governor effective to register an independent predetermined speed. Independent governors for registering different speeds permit each governor to be provided with characteristics best suited for the specific speed it is to register. Other objects and advantages of my invention will appear as the specification progresses.

For a better understanding of my invention reference may be had to the accompanying drawings wherein speed responsive devices particularly adapted to railway trains are disclosed. It is to be understood, however, that I do not wish to limit my invention to any specific application and the application to railway trains is by way of illustrating the many places my invention is useful.

Figures 1, 2:
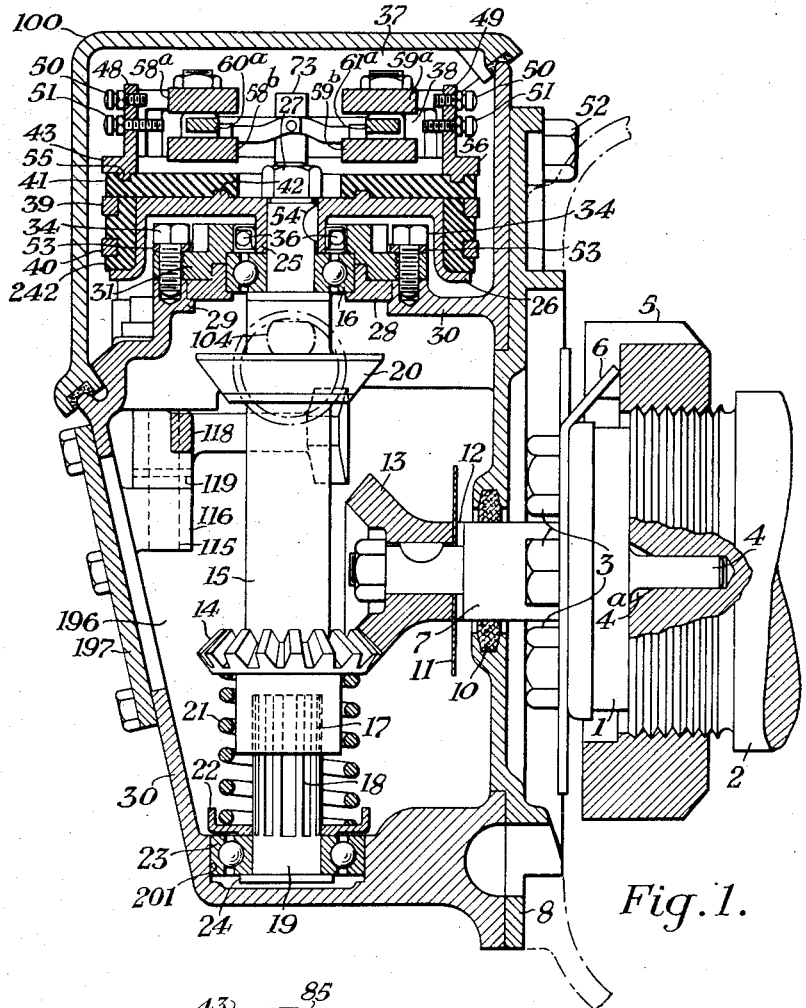
Figures 3, 4:
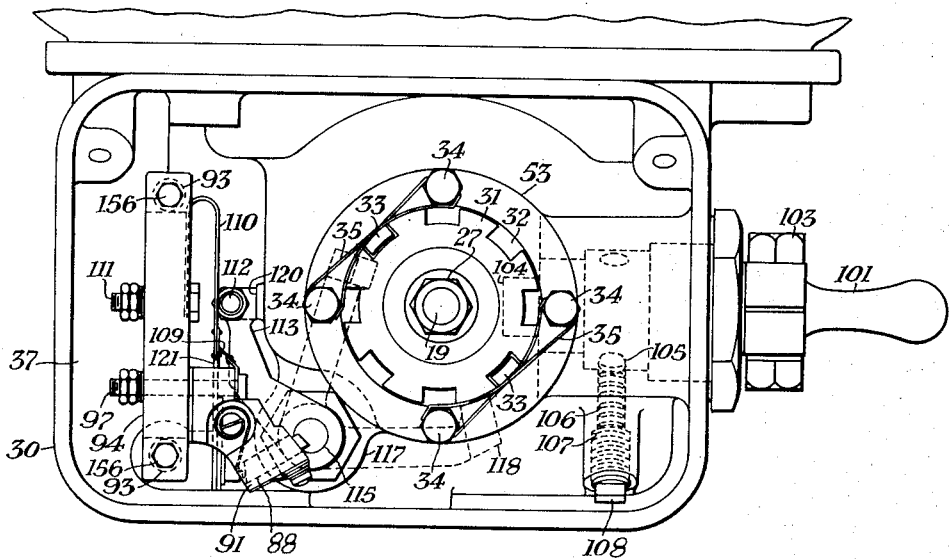
Figure 9:
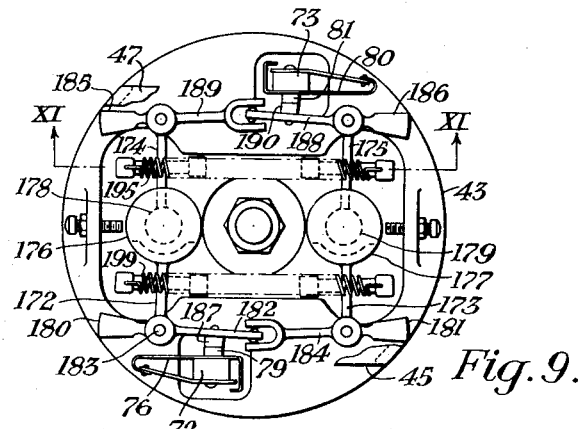
Figure 10:
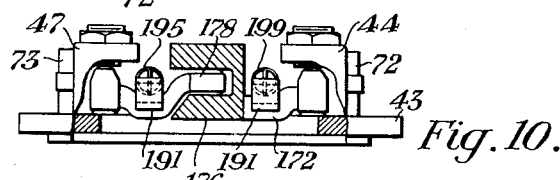
Figure 11:
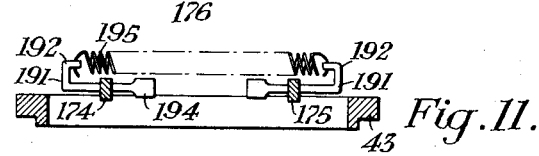
Figure 12:
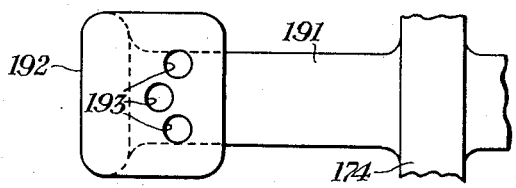
Figure 13:
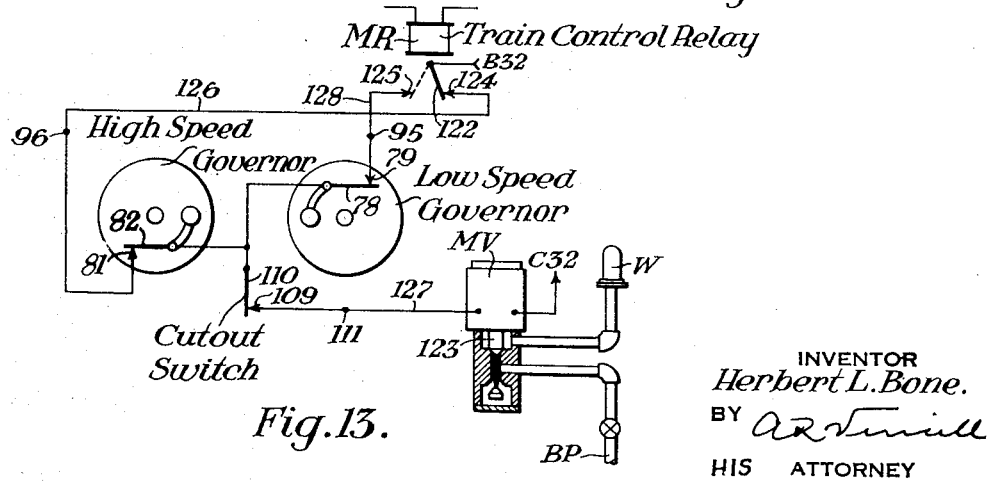

In the accompanying drawings, Fig. 1 is a vertical view partly in section of one form of a speed responsive device embodying my invention and which is operatively connected with the axle of a vehicle of a railway train. Fig. 2 is a plan view of the governor head of the speed responsive device of Fig. 1 and showing the inertia and contact parts thereof. Fig. 3 is a side view of the device of Fig. 1 with the cover of the governor chamber removed and certain of the parts broken away to show the cut-out mechanism. Fig. 4 is a plan view of the device of Fig. 1 with the cover of the governor chamber and the governor head both removed, to show the cut-out contact mechanism and the contact brush holders. Fig. 5 is a view partly in section showing an alternative driving mechanism for the speed responsive device of Fig. 1, and Fig. 6 is a view taken on the line VI—VI of Fig. 5. Figs. 7 and 8 are plan and side views, respectively, of a second form of governor head which may be applied to the device of Fig. 1 and which when so applied constitutes a second form of speed responsive device embodying my invention. Fig. 9 is a plan view with certain of the parts broken away of a third form of governor head which may be applied to the device of Fig. 1 and which when so applied constitutes another embodiment of my invention. Fig. 10 is a view partly in section taken from the left-hand side of Fig. 9, and Fig. 11 is a sectional view on the line XI—XI of Fig. 9. Fig. 12 is an enlarged detail view showing the spring adjustment member for the restraining spring of Fig. 9. Fig. 13 is a diagrammatic view of a control circuit and control mechanism for governing the speed of a railway train by the speed responsive devices illustrated in Figs. 1 to 12.

Referring first to Fig. 1, an axle extension plate 1 is bolted to the end of an axle 2 of a vehicle of a railway train by means of tap bolts 3, and is centered and solidly keyed to the axle 2 by means of a dowel pin 4 which fits into the axle center, and by a bar-shaped lug 4ª which fits into a slot in the end of the axle. To lock the usual bearing nut 5 for the axle 2, a sheet metal washer 6 is provided, the washer 6 being so designed that portions of it can be bent down into the usual locking slots provided in the face of the bearing nut 5, the portions to be bent down being so spaced that the nut 5 can be moved in small steps. A shaft portion 7 is formed integral on the axle extension plate 1 and projects through a separating plate 8 which plate is secured to a main casting 30 by tap bolts such as shown at 52. The main casting 30 is secured to the axle bearing housing of the vehicle axle 2 in any convenient manner not shown. This casting 30 forms a casing having two chambers, a gear chamber 196 and a governor head chamber 37, the gear chamber 196 being provided with an inspection plate 197 and an oil filler plug 198 (see Fig. 3) and the governor head chamber 37 being provided with a dirt proof cover 100. The plate 8 is provided with a felt oil seal washer 10 to prevent creepage of oil. As an additional means to prevent transfer of oil between the driving portion of the speed responsive device and the bearing of the axle 2, an oil deflecting plate 11, which is a thin metal disk, is also carried on the shaft portion 7. Suitable shims 12 are provided behind the oil deflecting plate 11 so that a bevel gear 13, which is keyed and bolted to the shaft 7, can be properly positioned with respect to a mating bevel gear 14. The driven gear 14 is cut on a tubular shaft 15 which extends from a point some little distance below the back of the gear 14, upward to the inner race of an upper ball bearing 16. The inner surface of the tubular shaft 15 is provided with splines 17 near its lower end which mate with splines 18 cut on a spindle 19. The tubular shaft 15 is also provided with a shifting plate 20, the purpose of which will be explained later. The driven gear 14 is held in its upper position by a spring 21 which presses against the back of the gear and rests in a cup 22, and the lower face of the cup 22 in turn rests against the inner race of a lower ball bearing 23, the ball bearing 23 being held from slipping off the spindle 19 by a collar 24 formed on the end of the spindle 19.

The outer race of the upper ball bearing 16 is held in a bearing retainer 28, which fits into a machined pocket 29 in the main casting 30. The bearing retainer 28 is held in place by means of a large nut 31 which is provided with clearance so that the outer race of the bearing 16 is not clamped although the bearing retainer 28 is clamped solidly. The nut 31 (see Fig. 4) is provided with locking slots 32 adapted to receive the lock members 33 of a lock washer 53, and which washer is in turn secured in position by tap bolts 34 screwed into the main casting 30. Locking wires 35 may be threaded through holes of the tap bolts 34 if desired. The nut 31 is provided with an oil seal 36 which prevents creepage of oil from the gear chamber 196 into the governor head chamber 37. The inner race of the bearing 16 is held in place against the upper end of the tubular shaft 15 by the hub 25 of a collector ring drum 26 which drum is keyed to the spindle 19 at 54 and is drawn down by means of a nut 27 on a threaded portion of the spindle 19. The outer race of the lower ball bearing 23 fits into a machined pocket 201 in the main casting 30. Inasmuch as the lower ball bearing 23 is held in position by the collar 24 on the lower end of the spindle 19 and the hub 25 of the collector ring drum 26 is held in position against the upper surface of the inner race of the bearing 16, all the forces set up by the spring 21 are taken up in the tubular shaft 15 itself. The only thrust transmitted through the shaft 15 is that resulting from the endwise thrust of the gear 14 and the weights of the gear 14 and shaft 15. This thrust as well as the weights of the spindle 19, the collector ring drum 26 and a governor head mounted thereon as will be shortly described are carried on the upper ball bearing 16 since the lower bearing 23 is free to move endwise in its pocket 201 as will be understood by an inspection of Fig. 1, and can carry no thrust. Hence the spindle 19 is accurately journaled in the main casting 30 in a vertical position, and the gear 14 mounted on the spindle 19 is held in mesh with the gear 13 secured to the train axle 2 with the result that the spindle 19 and collector ring drum 26 are normally rotated at a speed corresponding to the speed of the train, the thrust and weight of this drive mechanism being carried on the upper ball bearing 16. As will appear hereinafter, the tubular shaft 15 is at times depressed and the gear 14 lowered out of mesh with the gear 13 with the result that the spindle 19 and drum 26 are not then driven by the train axle 2.

The bearing (not shown) for the train axle 2 may be of the usual self-aligning type which type permits movement of the axle 2 about the center of the spherical surface of the bearing, and thus a slight up and down motion of the driving gear 13 is permitted. In order to prevent disengagement of the gears 13 and 14 when the driving gear 13 moves upward, the gear teeth are made as large as possible; and to prevent breakage of the gear teeth when the gear 13 moves downward, the spring 21 is so proportioned and adjusted that before sufficient force to break the teeth is obtained, the spring is compressed.

A governor head 38, a brush assembly, a terminal board and a cut-out contact mechanism are mounted in the governor chamber 37 together with the collector ring drum 26, and these several devices will now be described in the order named. The governor head 38 consists of an insulation ring 41 having a skirt 242, two collectors rings 39 and 40 and a governor plate 43 on the latter of which are mounted inertia and contact members. The collector rings 39 and 40 are molded into the skirt portion 242 of the insulation ring 41 which in turn is molded onto the drum 26 and is fixed in place on the drum by an annular lug 42. The governor plate 43 is secured to the upper surface of the insulation ring 41 in any convenient manner not shown, and is held in place by an annular lug 55. In addition to carrying the inertia and contact members, the governor plate 43 has its outer circumferential surface 56 adapted to serve as a collector ring for a common circuit connection as will subsequently be explained. Consequently, the collector rings 39 and 40, and the governor plate 43 are insulated from each other and from the rest of the mechanism and all three are rotated with the spindle 19.

As set forth hereinbefore, the governor plate 43 carries inertia and contact members and as shown in Fig. 2, it is provided with four bearings 44, 45, 46 and 47, and two step supports 48 and 49. As here shown, the four bearings 44, 45, 46 and 47 are positioned on the plate 43 one at each corner of a rectangle the center of which is the center of the plate. The two stop supports 48 and 49 are positioned adjacent opposite sides of the rectangle and each stop support is drilled and tapped to receive two stop screws 50 and 51. Each bearing 44, 45, 46 and 47 is provided with a bushing, the four bushings being indicated by the reference characters 44ᵃ, 45ᵃ, 46ᵃ and 47ᵃ, respectively. Each bushing has mounted therein a pivot pin 57 (see Fig. 3) which in turn carries an inertia member in the form of a bell crank, one of whose arms serves as a contact arm and the other arm of which is provided with a governor weight, the contact arm being disposed approximately at right angles to a center line between the center of the weight and the pivot pin. These four inertia members 58, 59, 60 and 61 are arranged in two pairs, the members 58 and 59 constituting what I shall term a low speed pair and the members 60 and 61 constituting what I shall term a high speed pair. In other words, the inertia members 58 and 59 form a low speed governor, and the inertia members 60 and 61 form a high speed governor. To clarify the following description I shall refer to the inertia members 58 and 59 as a low speed governor effective to register a speed which corresponds to a speed of twenty miles per hour for the railway train of which the axle 2 is a part, and I shall refer to the inertia members 60 and 61 as a high speed governor effective to register a speed corresponding to a speed of seventy-two miles per hour for the railway train. It is to be understood, of course, that my invention is in no way limited to these specific speeds and they are used by way of illustration only. Each of the low speed inertia members 58 and 59 is provided with a relatively large governor weight consisting of two portions disposed one above the other, the two portions of the weight of the member 58 being identified by the reference characters 58ª and 58ᵇ, and the two portions of the weight of the member 59 being identified by the reference characters 59ª and 59ᵇ. The two high speed inertia members 60 and 61 are each provided with a single governor weight of relatively small size and which weights are designated by the reference characters 60ª and 61ª, respectively. As shown more clearly in Fig. 1, the arrangement of the governor weights is such that the weight 60ª of the high speed inertia member 60 swings between the two weight portions 58ª and 58ᵇ of the low speed inertia member 58, and the weight 61ª of the member 61 swings between the two weight portions 59ª and 59ᵇ of the low speed inertia member 59. The contact arm 62 of the low speed inertia member 58 is made straight but the contact arm 63 of the other low speed inertia member 59 is forked to fit over the straight portion of the arm 62 and has secured to an outer prong of the fork a contact 78. In like manner the contact arm 64 of the high speed inertia member 61 is made straight but the contact arm 65 of the mating inertia member 60 is forked to fit over the straight portion of the arm 64 and has secured to an outer prong of the fork a contact 82.

The low and high speed governors are each restrained in their movement by a spring member and each has its movement limited by stops. For example, the low speed inertia members 58 and 59 are restrained from rotation about their pivot pins by means of a spring 66 one end of which is hooked to an adjusting screw 67 in the member 58 and the other end of which is hooked to an adjusting screw 68 in the member 59. In a similar manner the high speed inertia members 60 and 61 are restrained from rotation about their pivot pins by a spring 69 which has its two ends hooked to the adjusting screws 70 and 71 in the members 60 and 61, respectively. The outward motion of the weights of the members 58 and 59 is limited by the stop screws 50, and the outward motion of the weights of the high speed members 60 and 61 is limited by the stop screws 51. The motion of the low speed inertia members 58 and 59 in the direction to draw the respective weights toward the center of the plate 43 is limited by a contact post 72 which cooperates with the contact arms 62 and 63 of the low speed inertia members 58 and 59 in a manner to shortly appear. The motion of the high speed inertia members 60 and 61 to draw their weights toward the center of the plate 43 is limited by a contact post 73 which cooperates with the contact arms 64 and 65 of the high speed inertia members. The parts are so proportioned that at zero speed of rotation of the governor plate 43 the restraining spring 66 is effective to draw the weights of the low speed governor inward toward the plate center, the inward movement being limited by the contact post 72, but that rotation of the governor plate 43 causes a centrifugal force of the weights which force at some critical speed is effective to overcome the force of the restraining spring 66 and the weights moved outward from the plate center, the outward movement being limited by the stop screws 50. The speed of rotation of the governor plate 43 at which movement of the low speed governor parts occurs is in this instance the speed of rotation which corresponds to the speed of twenty miles per hour for the railway train. Again, the restraining spring 69 is effective at zero speed of the governor plate 43 to draw the weights of the high speed governor inward, the inward movement being limited by the contact post 73, but that rotation of the plate 43 causes a centrifugal force of the weights of the high speed inertia members which force at some critical speed is effective to overcome the force of the restraining spring 69 and the weights moved outward until they engage the stop screws 51. The critical speed of the plate 43 at which movement of the high speed governor parts occurs is in this instance the speed of rotation which corresponds to a speed of seventy-two miles per hour for the railway train.

The low speed governor and the high speed governor each effects a control through the medium of two contacts one of which is operated by the contact arms of the respective governor and the other of which is stationary and is carried on the associated contact posts 72 or 73 as the case may be. These two contact posts 72 and 73 are rectangular metal bars each of which extends through an opening in the governor plate 43 and is fastened in the insulation ring 41. The posts 72 and 73 are electrically connected to the collector rings 39 and 40, respectively, by means of flexible leads (not shown) which pass through holes drilled in the insulation ring 41, each lead being secured to the associate contact post and collector ring by terminal screws, or soldered as desired. A contact support 74 is secured to the contact post 72 by means of the screw 75 and this support has fastened to it at one end a spring contact finger 76 which finger has mounted thereon a contact 79 for engagement with the contact 78 secured to the outer prong of the fork of the contact arm 63 of the low speed governor. The end of the support 74 opposite that on which the spring contact finger 76 is secured is shaped to form a stop 83 for the contact finger as will be understood by an inspection of Fig. 2. It follows that with the contact arm 63 in the position illustrated in Fig. 2 and the contacts 79 and 78 are in engagement, a circuit connection is completed between the collector ring 39 and the governor plate 43, but that when the arm 63 is moved and the contact 78 breaks engagement with the stationary contact 79 the circuit connection between the collector ring 39 and the plate 43 is broken, this circuit connection including the flexible lead, post 72, support 74, contact finger 76, contacts 78 and 79, contact arms 62 and 63, and a flexible lead (not shown) bridging the metal parts of the bearings 44 and 45. In like manner the contact post 73 has secured thereon a contact support 77 on one end of which is fastened a spring contact finger 80 having a contact 81 adapted to engage the contact 82 secured to the outer prong of the fork of the contact arm 64 of the high speed governor. The opposite end of the support 77 is shaped to form a stop 84 for the spring contact finger 80. Hence, at such time as the contacts 81 and 82 make engagement, a circuit connection is completed between the collector ring 40 and the governor plate 43, but that when movement of the arm 64 takes place to break engagement between the movable contact 82 and the stationary contact 81 this circuit connection between the ring 40 and the plate 43 is broken, this circuit connection including the flexible lead, post 73, support 77, contact finger 80, contacts 81 and 82, contact arms 64 and 65, and a flexible lead (not shown) bridging the metal parts of the bearings 46 and 47. The manner of utilizing these contacts 78—79 and 81—82 of the two governors for accomplishing a desired control will be explained hereinafter.

The governor head 38 constructed in the manner described provides that vibration forces tending to move the head do not change the position of the governor weights with respect to the axis. For example, the weights of the low speed inertia members 58 and 59 are on opposite sides of the center of the governor plate 43 and are interlocked by means of the contact arms 62 and 63, so that the weight of one member cannot move with respect to the center of the plate unless the weight of the other member moves with it. Thus the only forces effective to move the weights are those tending to move the weights of both the inertia members 58 and 59 toward the center of the plate or away from the center. Any force tending to move the weights of the members 58 and 59 in the same direction with respect to the center (except radially outward or inward), such as a violent sidewise motion of the vehicle axle 2, sets up equal and opposite turning movements about the pivot pins of the members 58 and 59 which movements balance out at the point where the arms 62 and 63 engage with each other and thus cause no movement of the weights except for the arms 62 and 63 which are made as light as possible. It is clear that the same condition obtains for the high speed inertia members 60 and 61. It follows that both the low and high speed governors as here mounted on the single governor plate 43 are each balanced to eliminate the effect of sidewise vibration and sudden sidewise shocks. Theoretically, this balanced arrangement would permit mounting the governor plate 43 with its axis horizontal or in any other position instead of vertical as shown in the form of the invention here described.

The restraining spring 66 is so positioned that as the weights of the inertia members 58 and 59 move outward, which increases the force exerted by the spring, the spring moves closer to the pivot pins decreasing the moment arm. The parts are so proportioned that the resultant torque on the inertia members is substantially constant throughout the travel of the weights. As explained hereinbefore, the ends of the spring 66 are hooked to the adjusting screws 67 and 68 and hence the tension of the spring 66 may be varied. These adjusting screws 67 and 68 are mounted in their respective weight arms at such an angle that adjustment to increase the spring tension also moves the spring away from the pivots, increasing the moment arm, thus providing, within the limits of the space available, a greater increase in torque about the pivots than could be provided by changing the spring tension alone. It is clear that the relationship of the restraining spring 69 with respect to the high speed inertia members 60 and 61 is the same as that just explained for the spring 66 and the low speed inertia members 58 and 59 and it is thought to be unnecessary to repeat the description in detail.

The stationary contacts 79 and 81 are mounted on the flexible spring contact fingers 76 and 80, respectively, for the following reasons: When either governor is running close to its critical speed, vibration might cause slight movements of the inertia members if the weight elements are not exactly balanced and such movements might cause momentary opening of the contacts if the stationary contacts were not mounted flexibly enough to permit the movement. The spring contact fingers 76 and 80 are so proportioned and adjusted as to permit such vibration and to maintain a contact pressure of say about one ounce. Furthermore, a slight amount of wiping of the contacts is desirable in order to make the contacts self-cleaning. Since the spring contact fingers 76 and 80 and the contacts 79 and 81 carried thereon are rotated along with the governor plate 43, the contact pressure between the contacts 78 and 79 of the low speed governor and the contact pressure between the contacts 81 and 82 of the high speed governor is, in each case, dependent upon two factors, namely, the spring force of the contact finger and the centrifugal force at the critical speed of the respective governor. The effect of the speed is to tend to force the stationary contacts 79 and 81 outward due to their centrifugal forces. The spring contact fingers 76 and 80 must be strong enough to resist this centrifugal force and in addition provide the contact pressure desired. In practicing my invention I have found it to be desirable to have the spring force of such value that the contact fingers 76 and 80 rest against their respective stops 83 and 84 with zero pressure at the critical speed of the respective governor. For example, at the critical speed of twenty miles per hour at which the low speed governor operates and the contact arm 63 is moved inward to break engagement between the contacts 78 and 79, the force of the spring contact finger 76 is such that it rests against the stop 83 with substantially zero pressure. At the critical speed of seventy-two miles per hour at which the high speed governor operates and its contact arm 64 is moved inward to break engagement between the contacts 81 and 82 the spring contact finger 80 rests against the stop 84 with substantially zero pressure. To accomplish these desirable operating conditions for the stationary contacts of the two governors the respective contact fingers 76 and 80 are proportioned and adjusted as follows: The initial pressure of the contact spring fingers 76 and 80 against their respective stops 83 and 84 at zero speed of the governor plate 43 and with the associated contact arm moved back to open the contact is in each case such that at the speed of the governor plate corresponding to the critical speed of the respective governor and with the contact open, the centrifugal force caused by the weights of the stationary contact and of the contact finger effectively reduces the pressure between the contact finger and its stop to zero but does not move the finger away from the stop. The rate of each spring contact finger is so proportioned that at the critical speed of the respective governor the change in the spring pressure caused by moving the stationary contact the distance between the point where the spring contact finger is against the contact post and where the finger engages the stop is less than the change in the force exerted by the movable contact when moved the same distance due to the governor weights increasing their distance from the center of the governor plate. Consequently, at zero speed of the governor plate 43 the restraining spring of each governor is effective to draw the governor weights in toward the center of the plate and to swing the contact arms outward with the movable contact in engagement with the stationary contact, the spring contact finger being forced back against its contact post with a predetermined initial contact pressure between the movable and stationary contacts. The force of the restraining spring is, however, opposed by the force exerted by the spring contact finger.

With the restraining spring positioned to exert substantially constant torque on the inertia members throughout the travel of the governor weights and the parts proportioned to provide the contact pressures just explained, the resultant force due to the centrifugal forces on the governor weights and on the stationary contact, and the forces of the restraining spring and the spring contact finger, insure that, when the weights of either governor start to move outward, they immediately move to their extreme outer position without hesitation at any point in their travel. The initial force of the restraining spring of each governor is made sufficient that no movement of the inertia members occurs until the critical speed of the respective governor is reached. However, as the critical speed of the governor is reached and the governor weights start to move outward and the contact arms start to move inward, the stationary contact follows the movable contact until the spring contact finger reaches its stop, and at this point the movable contact and the stationary contact still engage with a pressure sufficient to insure a reliable circuit connection therethrough notwithstanding vibration movements as explained hereinbefore. As the critical speed of either governor is reached and its inertia members start to move, their movement increases the centrifugal forces of the weights whereas the force of the restraining spring remains substantially constant so that the resultant force causes an outward movement of the governor weights even though there is no further increase in the speed of the governor plate, the weights then remaining against their outward stop for all speeds above the critical speed. This operation of the governor parts is obtained by the structure described during an accelerating operation of the governor plate since the torque exerted by the restraining spring remains substantially constant, and due to the fact that the centrifugal forces exerted by the weights increase in direct proportion to increase in the radial distance of the weights from the axis of the governor plate, and also due to the fact that the force of the spring contact finger is in opposition to the force of the restraining spring. During deceleration, the weights being in their extreme outward position, they do not move in until their centrifugal forces become less than the force of the restraining spring. Due to their increased distance from the governor plate center, the speed at which the weights start to move inward is something less than the speed at which they move outward, but once the movement inward has started, the weights immediately move to their extreme inner position since the force of the spring remains constant whereas the centrifugal forces decrease in direct proportion to the decrease in the radial distance of the weights from the plate center. I have found that with speed responsive devices constructed in the manner described both the low speed governor and the high speed governor operate during deceleration at speeds substantially within four per cent of the speeds at which they operate during acceleration. Hence, both the low speed and the high speed governors are of the unstable class since each provides a restraining force effective to cause its inertia members to occupy one extreme position at all speeds below a respective critical speed and then provides a resultant force effective to move the inertia members to their other extreme position at the critical speed without further increase in the speed, this resultant force being also effective to hold the inertia members in this second extreme position at all speeds above the critical speed. During deceleration the resultant force at substantially the critical speed becomes effective to cause the inertia members to move from the outer extreme position back to the inner extreme position.

The brush assembly and the terminal board will now be described. Referring to Figs. 3 and 4, the contact brushes 86 and 87 engage the collector rings 39 and 40, respectively, and a third contact brush 88 engages the circumferential surface 56 of the governor plate 43. These three brushes 86, 87 and 88 are preferably of the usual carbon type and are held in the brush holders 89, 90 and 91, respectively, which holders are held on a terminal board 92 by terminal posts 95, 96 and 97, respectively, the arrangement being such that electrical connection is provided between each terminal post and its respective contact brush. The terminal board 92 is held between two studs 93 which are rigidly fastened in the main casting 30. The studs 93 are provided with tapped holes at their upper ends and by means of tap bolts 156, a flat plate 94 is clamped down on the terminal board 92 and the terminal board is firmly held in place. The parts are so arranged that removal of the plate 94 permits the removal of the entire terminal board and brush assembly. The terminal post 97, which is electrically connected with the governor plate 43, is in turn connected with a terminal post 111 through a pair of spring contacts 109 and 110 to be referred to later. Wires attached to the terminal posts 95, 96 and 111 are carried out of the governor head chamber 37 through a rubber hose 98 connected to a strain relief bushing 99 in the main casting 30. It follows that the governor plate 43 is electrically connected with the terminal post 111, and the stationary contacts 79 and 81 of the low and high speed governors, respectively, are electrically connected to the respective terminal posts 95 and 96, and the circuit connections are carried thence by wires brought into the governor head chamber through the hose 98.

That the governor head 38 may be disconnected from the driving axle 2 and the circuit connections leading to the governor contacts may be opened under such disconnected condition of the governor head, I provide a disengaging mechanism which is operated through the medium of a handle located outside of the mechanism case. As here shown, a handle 101 is secured by means of a bolt 103 to a shaft 102 which is journaled in a bearing in the main casting 30 and the inner end of which terminates in an eccentric 104, the eccentric being in turn adapted to engage the shifting plate 20 on the tubular shaft 15. The arrangement is such that with the handle 101 down as illustrated in Fig. 3, the eccentric 104 is free from the plate 20 and the gears 13 and 14 are in mesh and the governor head 38 is in an operating condition, but that with the handle 101 lifted one-half turn the eccentric 104 engages the shifting plate 20 to force the tubular shaft 15 downward against the action of the spring 21, and the driven gear 14 is disengaged from the driving gear 13 and an inoperative condition of the governor head is established. The flat surface of the eccentric 104 rests firmly on the upper surface of the shifting plate in this disengaged position. The handle 101 and the eccentric 104 are held in the position corresponding to the engaging position of the gears by means of a steel ball 105 engaging a hemispherical depression in the shaft 102, the ball 105 being forced into position by means of a heavy coil spring 106 located in a tubular cavity 107 which is closed at its outer end by a pipe plug 108. A corresponding depression in the shaft 102 is also provided for the disengaging position of the handle 101.

In order to assure that the electrical circuits are opened when the governor head is disconnected from the driving axle, the movement of the shifting plate 20 is made to operate the spring contact 110, the arrangement being such that the contact 109—110 is closed when the plate 20 is up and the contact is opened when the plate is forced downward. The contact spring 110 is operated by a pin 112 of suitable insulating material and which pin is held in a lever 113, the lever 113 being in turn pinned at 114 to a shaft 115. The shaft 115 is journaled in two bearings 116 and 117 formed in the main casting 30 and has pinned to it at 119 a forked cam-shaped lever 118 which lever is adapted to be operated by the shifting plate 20. A flat spring 121 held rigid at one end by a tap screw 200 engages the lever 113 and tends to rotate the lever 113 clockwise to force it back against a stop 120. The cam surface of one of the arms of the forked lever 118 engages the lower face of the edge of the shifting plate 20 and is so shaped that downward movement of the plate 20 operates the forked lever 118 counter-clockwise as viewed in Fig. 4 and the lever 113 and pin 112 are moved to the left against the force of the spring 121 with the result that the contact spring 110 is forced out of engagement with the contact spring 109 and the circuit connection therethrough is broken. When the shifting plate 20 is moved upward, the cam lever 118 is operated clockwise by action of the spring 121 and by the second of the arms of the forked lever 118 engaging the top edge of the plate 20 and the pin 112 is moved to the right away from the contact spring 110 and that spring by its own resiliency engages the contact spring 109 to close the circuit connection therethrough. Normally the lever 113 would be operated by the spring 121 alone during this later operation, the forked lever being provided as protection in case the spring 121 should break. The parts are so proportioned that, when the shifting plate 20 occupies its full upward position, the cam surfaces of the forked lever 118 do not touch the plate since the spring 121 engages the lever 113 and forces it back against a stop 120. It follows that with the handle 101 down, the governor head 38 is operatively connected with the axle 2 through the drive mechanism including the gears 13 and 14, and the common circuit contact 109—110 is closed, but that with the handle 101 rotated upward one-half turn, the governor head is disconnected from the axle 2 and the contact 109—110 is open, the handle 101 being held in either of its two positions through the medium of the spring 106.

Many places where a speed responsive device embodying my invention may be used will suggest themselves to those skilled in the art. One arrangement whereby the device when mounted on a railway train may be used in connection with a train control system is disclosed in Fig. 13. In Fig. 13, a relay MR is the train-carried master control relay of a train control system. The train control system may be any one of several types in present day use and is not shown for the sake of simplicity since its structure forms no part of my present invention. It is deemed sufficient for the present application to point out that under clear and high speed traffic conditions the master relay MR is so energized that its armature 122 is held in the right-hand position in engagement with a contact 124, that is, it is held in the position illustrated in Fig. 13. Under restricted and low speed traffic conditions the master relay MR is so energized that the armature 122 is held in the left-hand position in engagement with the contact 125, that is, it is held in the position opposite that shown in Fig. 13. MV is an electropneumatic valve operative when energized to hold an air valve 123 closed and when deenergized to open the valve 123 and connect the train brake pipe BP with the atmosphere through a vent of such characteristics as to produce a brake pipe pressure reduction effective to establish an application of the train brakes in accordance with standard practice. A whistle W may be attached to the valve MV for sounding a warning signal at such time as the brake pipe BP is vented to the atmosphere. For controlling the valve MV a circuit is provided which is traced from one terminal B32 of any convenient source of current such as a battery not shown over contact 122—124 of the relay MR, wire 126, terminal post 96 of the speed responsive device, contact 81—82 of the high speed governor of that device, cut-out contact 109—110, terminal post 111, wire 127, winding of the magnet of valve MV and thence to the opposite terminal C32 of the current source, and the valve MV is energized. It follows that under the clear traffic position of the master relay MR the electropneumatic valve MV is energized and the vent of the brake pipe is blanked for all speeds up to the critical speed of the high speed governor and which speed I have assumed to be seventy-two miles per hour, but that at this critical speed the high speed governor contact 81—82 is opened in the manner explained hereinbefore and the valve MV is deenergized to sound the whistle W and to effect an application of the train brakes. Again, at such time as the master relay MR is held in the restricted traffic position, a circuit is traced from the battery terminal B32 over contact 122—125 of the relay MR, wire 128, terminal post 95 of the speed responsive device, contact 78—79 of the low speed governor of that device, cut-out contact 109—110, terminal post 111, wire 127, winding of the magnet valve MV and to the opposite battery terminal C32. Hence, under the restricted traffic position of the master relay MR the magnet valve MV is energized as long as the speed of the train is below the critical speed of the low speed governor and which speed I have assumed to be twenty miles per hour, but that for speeds above this critical speed the low speed governor contact 78—79 is opened and the magnet valve MV is deenergized to sound the whistle W and to effect an application of the train brakes.

A second form of drive mechanism for operating the governor head is shown in Figs. 5 and 6. Referring to Figs. 5 and 6, the train axle 2 is threaded at its outer end to receive a nut 129 which is normally provided in roller bearing application to secure the inner race of the bearing. The face of the nut 129 is slotted to receive a lock bar 130 which is held in place by tap bolts 131 screwed into the end of the axle 2. At least one of the slots in the face of the nut 129 is finished to receive a driving ball nut 132 of a driving pin 133 which is secured in a crank 134. This crank 134 is provided with a shaft pin 138 to which is keyed a driving gear 13ª. A separating plate 8ª, which is carried on the main casting 30 in a manner similar to the separating plate 8 of Fig. 1, is provided with a hub 135 which is bored to receive two ball bearings 136 and 137, and in which bearings the hub 139 of the driving gear 13ª is journaled. As set forth in connection with Fig. 1, the vehicle axle 2 may be equipped with a self-aligning bearing which permits an up and down motion of the axle. It is clear that with the drive mechanism constructed as shown in Figs. 5 and 6 the driving ball nut 132 may move back and forth in the slot of the nut 129 with the result that the meshing of the driving gear 13ª with its mate is not affected by the up and down motion of the vehicle axle 2. It is to be seen, therefore, that the speed responsive device of Fig. 1 may readily be provided with the drive mechanism of Figs. 5 and 6.

A second form of governor head is shown in Figs. 7 and 8 and in which form the governor weights are mounted on flat springs. In this form of the invention the governor head consists of a governor plate 43ª, insulation ring 41 and collector rings 39 and 40, and is mounted on the collector ring drum 26 the same as in Fig. 1. The inertia member for the low speed governor consists of a low speed weight 140 and a flat spring 141 which spring is fixed at one end to an adjustable arm 142 by a bolt 145 and on the opposite end of which spring the weight 140 is secured by a bolt 144. The arm 142 is pivotally mounted on a pin 143 secured in the governor plate 43ª. A stop post 146 is also secured to the governor plate and is drilled and tapped to receive an adjusting screw 147 which is adapted to engage the adjustable arm 142 and adjust the tension of the spring 141. It follows that the governor weight 140 is biased to an initial position by the spring 141 and is capable of movement in a plane parallel to the governor plate. A contact post 149 extends through an opening 150 in the governor plate and is secured in the insulation ring 41, the post 149 being in turn electrically connected to the collector ring 39 through the medium of a flexible lead attached to the post and passing through a hole drilled in the insulation 41 in the manner explained for Fig. 1. A contact spring 151 is fastened to the contact post 149 and this contact spring 151 is adapted to make engagement with a contact 152 mounted on the weight spring 141, the contact spring 151 being also provided with stop members 153 and 154 which are secured to the post 149. A stop 155 is mounted on the governor plate for limiting the outward movement of the weight 140. The parts are so proportioned and adjusted that at zero speed of the governor plate 43ª the spring 141 biases the weight 140 toward the center of the plate and to a position where the contact 152 engages the contact spring 151 with sufficient force to press that spring against the stop member 153, the final tension on the spring 141 being adjusted through the medium of the screw 147. Hence, in this normal position of the low speed governor of Fig. 7 an electrical connection is completed from the governor plate 43ª to the collector ring 39 through the contact 151—152. At the speed of the governor plate 43ª which corresponds to the speed of twenty miles per hour for the train of which the driving axle 2 is a part, the centrifugal force of the weight 140 overcomes the biasing force of the flat spring 141 and the weight moves outward until it engages the stop 155, the movable contact 152 breaking engagement with the stationary contact 151 which now rests against the stop member 154. The rate of the flat spring 141 and its adjustment are so proportioned that an "unstable" operation of this low speed governor is obtained but at the same time it is rigid enough to support the governor weight without vibration and chattering of the contacts.

The inertia member for the high speed governor of Fig. 7 consists of a flat spring 157 and a weight 158, the weight 158 being mounted on one end of the spring by means of a bolt 159 and the other end of the spring being secured by means of a bolt 161 to an adjustable arm 160. The arm 160 is pivotally mounted on the governor plate 43ª at 162. A stop post 163 is mounted on the plate and is drilled and tapped to receive an adjusting screw 164 for adjusting the position of the arm 160 and hence adjusting the tension of the weight spring 157. A contact post 165 extends through an opening 166 in the governor plate and is secured in the insulation ring 41. This post 165 is electrically connected with the collector ring 40 by a flexible lead in the manner explained and has secured thereon a contact spring 167 adapted to make engagement with a contact 168 mounted on the weight spring 157, the contact spring 167 being also provided with two stop members 169 and 170. A stop post 171 secured to the governor plate 43ª limits the outward movement of the weight 158. The parts are so proportioned that at zero speed of the governor plate the spring 157 biases the weight 158 toward the center of the governor plate and to a position where the contact 168 engages the spring contact 167 and forces that spring contact back against the spring member 170 with a predetermined initial pressure. In this normal position of the high speed governor an electrical connection is completed between the collector ring 40 and the governor plate 43ª through the contact 167—168. When the governor plate 43ª is rotated at a speed corresponding to the speed of seventy-two miles per hour of the railway train, the centrifugal force of the weight 158 overcomes the bias of the spring 157 and the weight moves outward to the stop 171 and in which position connection between the contacts 167 and 168 is opened. The rate of the weight spring 157 and its adjustment are so proportioned that an "unstable" operation is obtained but chattering and vibration of the contacts are avoided. It is clear that the governor head disclosed in Figs. 7 and 8 when connected to the drive mechanism of either Fig. 1 or 5 will operate the control mechanism of Fig. 13 in the same manner as described for the governor head of Figs. 1 and 2.

A third form of governor head is disclosed in Figs. 9, 10, 11 and 12 and wherein the insulation ring 41, the collector rings 39 and 40 and the governor plate 43 are mounted on the collector ring drum the same as in the former cases. In this form of the invention the bearings 44, 45, 46 and 47 are positioned on the governor plate 43 in a manner similar to that of Fig. 2 and an inertia member is pivotally mounted in each bearing, the four inertia members being here identified by the reference characters 172, 173, 174 and 175. The two inertia members 172 and 173 cooperate to form the low speed governor and the two members 174 and 175 cooperate to form the high speed governor. Each of these four inertia members is in the form of a bell crank having a weight arm and a contact arm which are at right angles to each other. The governor weights 176 and 177 of the low speed inertia members 172 and 173, respectively, are each formed in two portions as will be understood by an inspection of Fig. 10, but the weights 178 and 179 of the respective high speed inertia members 174 and 175 are each a single weight of relatively small size and are adapted to swing between the two portions of the weights of the low speed inertia members in the same manner as explained for the governor weights of Figs. 1 and 2. As here shown, each inertia member 172, 173, 174 and 175 is provided with an auxiliary weight which is mounted on an arm the center line of which is in the same plane as the center line of the contact arm, the contact arm and the auxiliary weight being located, however, on opposite sides of the pivot. For example, the low speed inertia members 172 and 173 are provided with the auxiliary weights 180 and 181, respectively. In like manner the auxiliary weight 181 of the other low speed inertia member 173 is positioned opposite the contact arm 184. The high speed inertia members 174 and 175 are provided with the auxiliary weights 185 and 186, respectively, and each of these auxiliary weights is positioned as to balance the contact arm.

The contact arms 182 and 184 of the low speed governor are interlocked and to that end the arm 182 is formed straight and the arm 184 is formed with a forked end to fit over the arm 182. As here shown, the straight arm 182 has mounted thereon a circuit controlling contact 187 which is adapted to engage the stationary contact 79 mounted on the contact finger 76 secured to the contact post 72, whereas in Fig. 2 the movable contact was mounted on the outer prong of the forked arm. The contact arms 188 and 189 of the high speed governor are interlocked by being arranged with the arm 188 straight and the arm 189 forked to fit the arm 188 and the straight arm 188 is provided with a contact 190 which is adapted to engage with the stationary contact 81 mounted on the contact finger 80 secured to the contact post 73. The stationary contacts 79 and 81 are mounted on spring contact fingers 76 and 80 which themselves are carried on the contact posts 72 and 73 in the manner explained for Fig. 2 except for the fact that the contact fingers are shaped to form stops whereas in Fig. 2 the contact supports are shaped to form stops and for the fact that the posts 72 and 73 are here positioned not on the diametrical line of the governor plate which passes through the interlocking point of the contact arms but are located slightly to one side of such a line. It will be understood, of course, that the contact posts 72 and 73 of Fig. 9 are electrically connected through flexible leads with the collector rings 39 and 40 and that the outer surface 56 of the plate 43 is adapted to make engagement with the contact brush 88 the same as in Figs. 1 and 2. It follows that an electrical connection is completed between the contact brush 86 which engages the collector ring 39 and the brush 88 which engages the outer surface of the governor plate 43 when the contact 79—187 of the low speed governor is closed, but that this circuit connection is opened when the governor is operated to move the contact 187 out of engagement with the stationary contact 79. Also, an electrical connection is completed between the brush 87 which engages the collector ring 40 and the brush 88 which engages the governor plate 43 when the contact 81—190 of the high speed governor is closed, but that this connection is opened when the governor is operated to move the contact 190 out of engagement with the stationary contact 81.

Each inertia member 172, 173, 174 and 175 has formed on its weight arm an L-shaped member for connection with a restraining spring. Referring especially to Figs. 11 and 12, an L-shaped member 191 is formed on the weight arm of the inertia member 174, and a projection 192 of this member 191 is drilled with holes as indicated at 193 of Fig. 12. Each of the other inertia members 172, 173 and 175 has formed thereon a similar L-shaped member to that just described for the inertia member 174. A restraining spring 195 has one end hooked into one of the holes 193 of the L-shaped member 191 on the inertia member 174 and its other end hooked into one of the holes on the L-shaped member of the high speed inertia member 175. The parts are so proportioned and adjusted that at zero speed of the governor plate 43 the restraining spring 195 is effective to draw the weights of the inertia members 174 and 175 toward the center of the plate 43 and to move the contact arms 188 and 189 outward with the contact 190 in engagement with the contact 81, the movement being limited by the contact post 73. When the plate 43 is rotated at the speed corresponding to a speed of seventy-two miles per hour of the railway train the centrifugal forces of the main governor weights 178 and 179 are effective to overcome the force of the restraining spring 195 and the weights moved outward and the contact 81—190 is opened, the movement of the weights being limited by the stop screws 50. Hence, this high speed governor occupies the position to close the contact 81—190 at all speeds of the governor plate below the critical speed but at the critical speed the parts move to their other extreme position and the contact is opened without any further change in the speed of the plate since the torque of the restraining spring 195 remains substantially constant during this movement but the centrifugal forces of the weights increase as they move outward from the plate center. It is clear that by changing the holes to which the spring 195 is connected the tension of the spring can be varied and operation of the associated governor adjusted accurately at the predetermined critical speed.

A restraining spring 199 is connected with the low speed inertia members 172 and 173 and this spring functions in a manner similar to that just explained for the spring 195 except for the fact that the parts are so proportioned that the centrifugal forces of the governor weights 176 and 177 become effective when the plate 43 is rotated at a speed corresponding to the speed of twenty miles per hour of the railway train to overcome the force of the restraining spring 199 and the weights moved outward to open the contact 79—187.

On the weight arm of the inertia member 174 and located opposite the position of the L-shaped member 191, a balancing member 194 is formed. This member 194 is so proportioned that its mass balances the mass of the L-shaped member and a better balanced arrangement for the inertia member 174 is obtained thereby. In a like manner each of the other inertia members 172, 173 and 175 is provided with a balancing member positioned opposite its L-shaped member. I have found that with each inertia member constructed in the manner here described, movement of the governor parts during deceleration occurs at a speed very close to the speed at which movement occurs during acceleration, and furthermore with the restraining spring attached to the inertia members in the manner disclosed for this third form a relatively large range of speed regulation is obtained without changing any of the parts other than the connection of the spring.

It is clear that with the governor head of Figs. 9, 10, 11 and 12 mounted on the drive mechanism of either Fig. 1 or 5, the control mechanism of Fig. 13 may be operated in the manner previously explained.

From the foregoing description of this third form of governor head it is clear that it is of the unstable type. The head is balanced statically without the weights, and the weights are so proportioned that they do not cause any unbalance of the head as a whole. Furthermore, the design of this third form of governor head is such, that, due to its shallowness, the moment arm of a couple which might be produced due to dynamic unbalance tending to displace the head with respect to its axis of rotation, would be very short so that it probably would have very little effect. The design of the head is such that at any section taken perpendicular to the axis of rotation, the weight on one side of the axis is reasonably well balanced with respect to the weight on the other side. The result of this condition is an inherent dynamic balance if the static balance is correct.

The individual governor weights and inertia members are balanced as follows: Referring to Fig. 9, if a line is drawn between the two pivots of the low speed inertia members 172 and 173 and perpendiculars be drawn to this line at the pivots, the center of gravity of each individual inertia member 172 and 173 lies on the perpendicular line through the respective pivot. It is theoretically desirable that these two perpendiculars on which are located the centers of gravity of the inertia members remain parallel at all times. This, of course, is obviously impossible since the weights 176 and 177 move away from this position in opposite direction during their travel from one extreme position to the other. This movement, however, is slight and does not materially affect the operation.

The position of the center of gravity on this perpendicular line is effected as follows: Looking at the inertia member 172, for example, the perpendicular line is assumed to pass through the center of the governor weight 176 which constitutes the main mass of the inertia member. The contact arm 182 is assumed to lie on the line between the two pivots, and it is therefore perpendicular to the aforementioned perpendicular through the weight 176. The contact arm 182 is balanced against the auxiliary weight 180 so that the center of gravity of these two parts lies on the perpendicular line through the weight 176. The L-shaped member 191 holding the spring 199 is balanced by the associated member 194 so that the center of gravity of these two parts also lies on the perpendicular. The center of gravity of the weight 176 is, of course, at the center, and therefore also on the perpendicular. If now the respective parts of the inertia members 172 and 173 are similar the center of gravity of each inertia member 172 and 173 of the low speed governor lies on the perpendicular through the center of its weight and is the same distance from the center of the pivot. If now any vibrational force in any direction is set up, it acts at the respective centers of gravity of the individual inertia members, and by simple mechanics it will be apparent that the moments tending to turn these inertia members about their pivots are equal since the parallel lines of the forces due to vibration passing through their centers of gravity are at equal distances from the centers of the pivots and the forces are equal since the weights of the two members are equal. Since the moments are then equal and in the same direction they tend to move one inertia member toward the center of the governor head and the other inertia member away from the governor head center with equal forces. Due to the interlocking connection of the contact arms 182 and 184, it is impossible for the inertia members to move in this manner and the forces tending to produce movement as the result of vibration or shocks are balanced out.

Since the center of gravity of each inertia member 172 and 173 lies a certain distance from its pivot and lies on the perpendicular line mentioned, and since the weights of the parts themselves are equal, the centrifugal forces due to the rotation of the governor head cause equal turning moments about the pivots. These turning moments are opposed by spring 199 and they tend to move both weights away from the center to a position to open the contact 79—187.

It is clear that the balancing of the high speed inertia members 174 and 175 is effected in exactly the same manner.

The result of this balancing is that within reasonable limits which are defined by the angular displacements from the theoretical perpendicular of the line through the pivot and the center of gravity, the inertia members are perfectly balanced against vibration of the governor as a whole, and so are not affected by any movement of, or shock to, the vehicle truck on which the governor is supported.

An analysis of the parts of the form of governor head as disclosed in Figs. 1 and 2 will disclose that the inertia members are balanced against vibration of the governor as a whole in a manner similar to that just explained for the form of governor head disclosed in Figs. 9 to 12.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. A speed responsive device comprising, a plate which is adapted to be rotated at different speeds, two inertia members pivotally mounted on the plate each at a different point some distance from the center, a contact arm and a weight arm for each member, said contact arms effective to cooperate with each other to permit the weight arms to swing away from the center of the plate or toward the center only in unison, contact mechanism mounted on the plate and operatively connected with the contact arm of at least one of said members, restraining mechanism connected with said members and effectitve to bias said members to operate the contact mechanism to a given position, and said restraining mechanism so proportioned that the centrifugal forces exerted by the weight arms when the plate is rotated are effective to operate the contact mechanism away from said given position only at speeds above a predetermined speed.

2. A speed responsive device comprising, a plate which is adapted to be rotated at different speeds, two inertia members pivotally mounted on the plate each at a different point some distance from the center, a contact arm and a weight arm for each member, said contact arms effective to cooperate with each other to permit the weight arms to swing away from the center of the plate or toward the center only in unison, contact mechanism mounted on the plate and operatively connected with at least one of said members, and means including a spring the two opposite ends of which are connected with the weight arms respectively, and said spring effective to bias said members to operate the contact mechanism to a given position and to permit the centrifugal forces exerted by the weight arms when the plate is rotated to operate the contact mechanism away from said given position only at speeds above a predetermined speed.

3. A speed responsive device comprising, a plate which is adapted to be rotated at different speeds, two bell cranks mounted on the plate at points substantially an equal distance from the center and each provided with a weight arm and a contact arm, said contact arms interlocked with each other to permit the weight arms to swing away from the center of the plate or toward the center only in unison, a contact mounted on the contact arm of at least one crank, a stationary contact mounted on said plate, means including a spring the two opposite ends of which are connected with the two weight arms respectively and effective to bias said cranks to a position for causing the contact on said contact arm to engage the stationary contact, and said spring and weights being so proportioned that the centrifugal forces exerted by said weights when the plate is rotated are ineffective to rotate the cranks about their pivots and operate the contact on said contact arm away from said stationary contact at all speeds below a predetermined speed.

4. A speed responsive device comprising, a plate which is adapted to be rotated at different speeds, a first pair of inertia members pivotally mounted on one-half of the plate with the two members positioned on opposite sides of the center of the plate, a second pair of inertia members pivotally mounted on the other half of the plate with the two members positioned on opposite sides of the center of the plate, a contact arm and a weight arm for each of said inertia members, said contact arms of each pair formed to interlock with each other to permit the weight arms of the respective pair to swing away from the plate center or toward the center only in unison, a movable circuit controlling contact for each pair mounted on a particular one of the contact arms, two stationary circuit controlling contacts mounted on the plate, a spring for each pair of inertia members the two opposite ends of which are connected with the weight arms of the associated pair and which is effective to bias the members to a position for causing the associated movable contact to engage a particular one of the stationary contacts, and said spring and weights of each pair so proportioned that the centrifugal forces exerted by said weights when the plate is rotated are ineffective to rotate the members about their pivots and operate the movable contact away from the stationary contact at all speeds below a particular predetermined speed.

5. A speed responsive device comprising, a plate which is adapted to be rotated at different speeds, two inertia members pivotally mounted on the plate on opposite sides of the center, means effective to interlock said members to permit movement of the members about their pivots in unison only, contact mechanism mounted on the plate and operatively engaging at least one of said members, restraining means including a spring connected to both said members and effective to bias said members to operate the contact mechanism to a given position, and said parts so proportioned and adjusted that the centrifugal forces exerted by said members when the plate is rotated are effective to operate said contact mechanism away from said given position only at speeds above a predetermined speed.

6. A speed responsive device comprising, a plate, means including a pair of gears for operatively connecting said plate with a shaft for rotation of the plate at a speed determined by the speed of the shaft, contact mechanism mounted on said plate and biased to a closed position, another contact biased to a closed position, means including an inertia member mounted on the plate and operatively connected with said contact mechanism for operating said contact mechanism away from said closed position at a predetermined speed, and manually operable means effective to disengage said gears and to open said other contact in unison.

7. A speed responsive device comprising, a plate which is adapted to be rotated at different speeds, a bell crank having a weight secured to one arm and a circuit controlling contact secured to the other arm, means for pivotally mounting said crank on said plate in a position in which the center of the weight and the center of the contact are located on diametrical lines of the plate substantially at right angles to each other, a stationary contact mounted on the plate for engaging the contact of the crank and positioned to limit rotation of the crank about its pivot in a direction to move the weight toward the center of the plate, means including a spring connected to said crank and effective to bias the crank to the position of engagement of said contacts, said springs so proportioned that the centrifugal forces exerted by said weight when the plate is rotated are ineffective to rotate said crank about its pivot to move its contact away from said stationary contact at all speeds below a predetermined speed, and an auxiliary weight mounted on the crank opposite the contact arm and proportioned to substantially balance the forces of the contact arm.

8. A speed responsive device comprising, a plate which is adapted to be rotated at different speeds, a circuit controlling contact mounted on the plate, a bell crank having a weight secured to one arm and a circuit controlling contact secured to the other arm, means for pivotally mounting said crank on said plate for movement from one position where its contact engages said plate contact to another position when said contacts are out of engagement in response to movement of said weight toward and away from the plate center, means including a spring effective to bias said crank to said one position, said spring so proportioned that the centrifugal forces exerted by said weight when the plate is rotated are ineffective to operate said crank away from said one position at all speeds below a predetermined speed and said spring so positioned as to exert substantially constant torque on said crank about its pivot in moving between said two positions, and an auxiliary weight mounted on the crank opposite the contact arm and proportioned to substantially balance the contact arm.

9. A speed responsive device comprising, a plate which is adapted to be rotated at different speeds, a circuit controlling contact spring mounted on said plate, an inertia member including a flat spring one end of which is secured to a pivot arm and the other end of which has mounted thereon a weight, a circuit controlling contact secured to said flat spring, means for mounting said member on said plate for movement of the weight toward and away from the plate center, and said flat spring so proportioned and adjusted that the inertia member is biased to the position where the contact on the flat spring engages the circuit controlling contact spring and the centrifugal forces exerted by said weight when the plate is rotated are ineffective to operate said member away from said position of engagement of the contacts at all speeds below a predetermined speed.

10. A speed responsive device comprising, a plate which is adapted to be rotated at different speeds, a first pair of inertia members pivotally mounted on one-half of the plate with the two members positioned on opposite sides of the center of the plate, a second pair of inertia members pivotally mounted on the other half of the plate with the two members positioned on opposite sides of the center of the plate, interlocking means for each of said pair of inertia members effective to permit the members of the respective pair to swing away from the plate center or toward the center only in unison, two circuit controlling contact mechanisms mounted on the plate one for each pair of inertia members, and a biasing spring for each pair of inertia members each of which springs is effective to bias the associated inertia members to a position for closing the associated contact mechanism, said springs each so proportioned and adjusted that the centrifugal forces exerted by the associated inertia members when the plate is rotated are effective to rotate the members about their pivots and operate the contact mechanism to an open position only at speeds above a predetermined speed.

11. A speed responsive device comprising a plate which is adapted to be rotated at different speeds, two bell cranks mounted on the plate at points substantially an equal distance from the center and each provided with a weight arm and a contact arm, said contact arms one formed with a forked end to fit over a straight end portion of the other whereby the weight arms are permitted to swing away from the center of the plate or toward the center in unison, a contact mounted on the outer prong of the fork, a contact mounted on a post secured in said plate for engagement with the contact on said prong, means including a spring the opposite ends of which are connected with the two weight arms respectively to bias said cranks to a position where said contacts engage, and said spring and weights so proportioned that the centrifugal forces exerted by said weights when the plate is rotated are ineffective to rotate the cranks about their pivots and the contact on the prong of said one contact arm away from the contact on the post at all speeds below a predetermined speed.

HERBERT L. BONE.